Oct. 14, 1941.　　　　L. E. ZERBE　　　　2,259,056
ROTARY MACHINE
Filed Dec. 27, 1938　　　　2 Sheets-Sheet 2
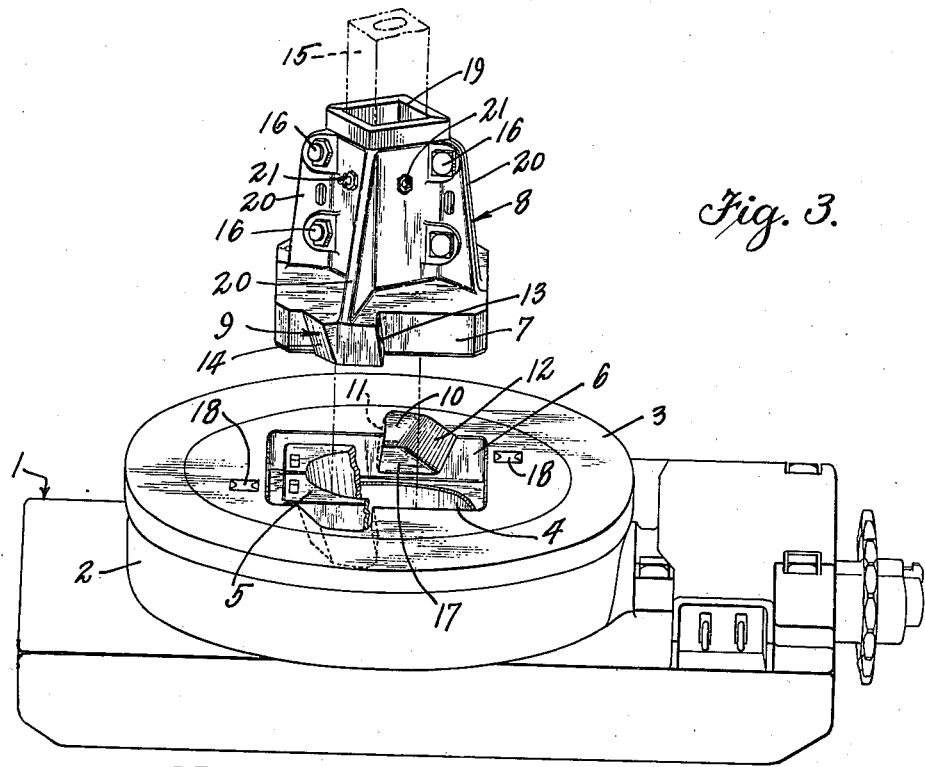
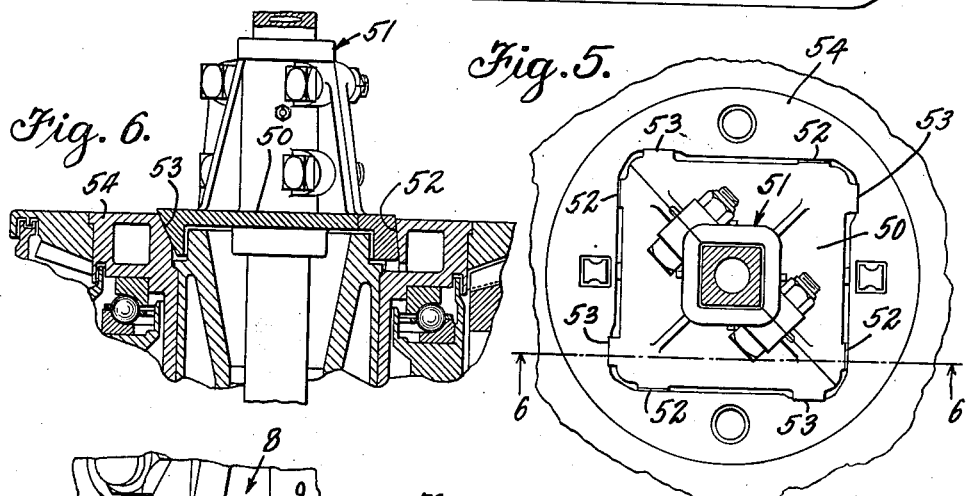
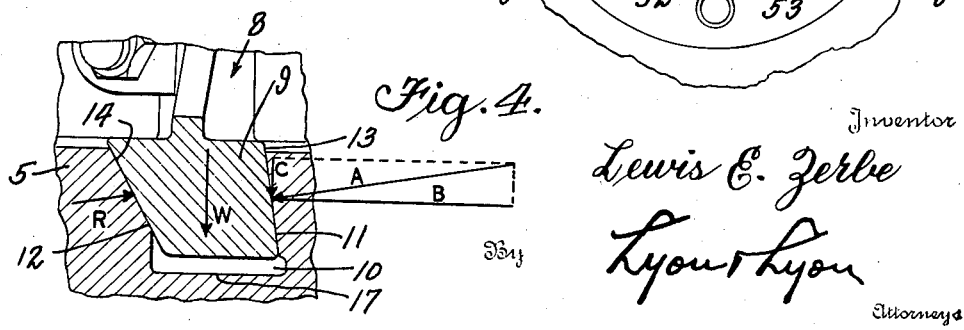
Inventor
Lewis E. Zerbe
By Lyon & Lyon
Attorneys Patented Oct. 14, 1941

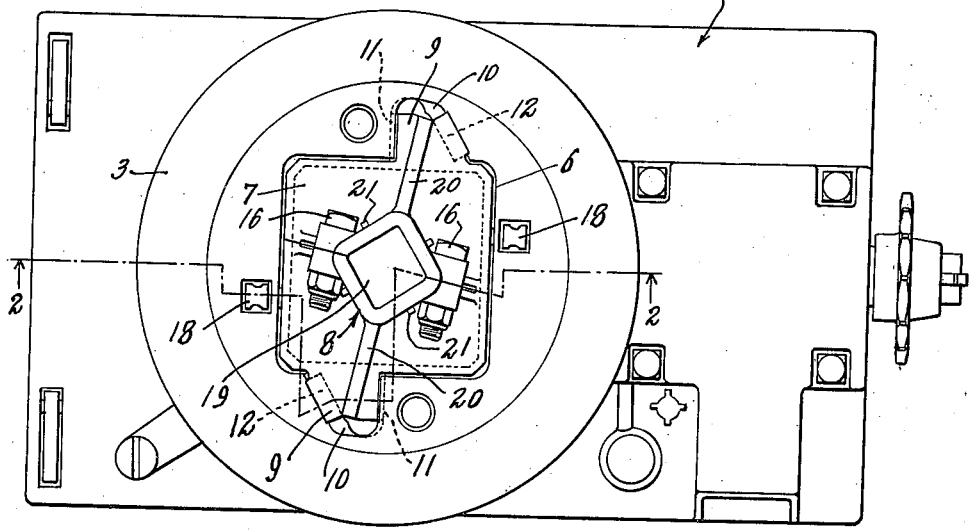

2,259,056

UNITED STATES PATENT OFFICE 2,259,056

ROTARY MACHINE

Lewis E. Zerbe, Moneta, Calif., assignor to The National Supply Company, Pittsburgh, Pa., a corporation of Pennsylvania Application December 27, 1938, Serial No. 247,755

8 Claims. (Cl. 255—23)

This invention relates to rotary drilling apparatus of the type employed in drilling oil, gas, water, or other wells or holes, and is more particularly directed to an improved form of driving connection between the rotating mechanism and rotated drill stem of such apparatus.

The principal object of this invention is to provide a connecting means between the rotating mechanism and the rotated drill stem wherein lost motion or back lash between the rotating means and the connection or drill stem is eliminated.

Another object of this invention is to provide a rotary machine having an integral kelly drive bushing which may be easily moved into or out of driving relation with respect to the rotary table, and when moved into operative position, cooperates with inclined surfaces to eliminate back lash or lost motion.

Other objects and advantages of this invention it is believed will be apparent from the following detailed description of a preferred embodiment thereof as illustrated in the accompanying drawings.

In the drawings:

Figure 1 is a top plan view of a rotary machine illustrating the kelly drive bushing in position in the rotary table.

Figure 2 is a sectional elevation taken substantially on the line 2—2 of Figure 1 illustrating the drive kelly in position.

Figure 3 is a perspective view of the rotary machine and drive bushing illustrating the drive bushing as elevated away from engagement with the opening in the rotary table and illustrating a portion of the master bushing broken away in the rotary table.

Figure 4 is a fragmental sectional view incorporating a force diagram therein.

Figure 5 is a top plan view of a modified form of construction embodying my invention.

Figure 6 is a sectional elevation taken substantially on the line 6—6 of Figure 5.

I have found that in modern high speed drilling, using the apparatus as it has heretofore been constructed, wherein heavy drilling apparatus is employed for drilling to great depths, that the drive connection between the drill stem or drive kelly and the rotary machine permits considerable lost motion and back lash, having a serious detrimental effect both upon the apparatus and upon the drill stem or kelly.

The apparatus as normally employed includes a kelly which is a multi-faced driven member which is driven from a rotary table through a connection which is ordinarily formed as a split bushing having driving faces complementary to the multiple faces of the kelly. This split bushing is normally fitted within a square recess formed in the top of a master bushing, which master bushing is in turn carried within and turned by the rotary table.

As the driving torque transmitted from the rotary table must pass through the split master bushing and in turn through the split drive bushing, a relatively great amount of lost motion or back lash develops between the rotary table and the drill stem or kelly. In accordance with my invention, a considerable portion of this back lash or lost motion is eliminated by providing a drive connection directly from the rotary table to an integral kelly drive bushing and in accordance with my invention, the lost motion between these elements is eliminated while still permitting normal easy insertion and withdrawal of the kelly bushing.

In my invention as illustrated in the accompanying drawings, the rotary machine is illustrated at 1. The rotary table commonly includes a stationary base 2 upon which the rotary table 3 is rotatably mounted. The rotary table 3 has a central opening 4 and supported in this opening is the split master bushing 5.

The construction of the rotary table 1 and the mounting of the master bushing 5 may be as illustrated in the copending application of Forrest J. Young, Serial No. 201,349, filed April 11, 1938.

As illustrated in Figures 1 to 4, inclusive, there is formed in the upper surface of the table 3 a non-circular recess 6 which is adapted to receive a non-circular base 7 of the kelly drive bushing 8. In this form of construction there is formed a pair of outwardly extending projections 9 formed upon opposite sides of the base 7. The projections 9 are adapted to fit in pockets 10 projected from the opening 4 of the table 3. Each pocket 10 has an inclined driving face 11 and an inclined surface 12. Each projection 9 has a complementary driving face 13 and an inclined surface 14. The proportions of these parts is such that the bushing 8 rests upon the inclined surface 12 with the driving faces 11 and 13 in operative engagement. If desired, the driving faces 11 and 13 are of complementary inclination, and in such case, the inclination of the driving faces is upward in the direction of rotation of the respective projections 9. Such inclination is hereinafter referred to as the engaging angle. The advantage of having an engaging angle on the driving faces 11 and 13 is that during rotation the table 3 will exert a downward force upon the kelly drive bushing 8, thereby counteracting any tendency of the bushing to bounce or jump.

The drive kelly bushing 8 may be as illustrated, formed in two sections secured together by means of bolts 16 in order to permit positioning of the bushing 8 about the kelly 15. The two sections are secured together by means of the bolts 16 and act as a single integral unit. Owing to this split construction, the companion surfaces 12 and 14 are placed at an angle relative to the driving faces 11 and 13 in order to relieve the bolts 16 of any undue shear load. In the construction illustrated, it will be noted that the driving faces 11 tend to force the two halves of the bushing 8 to slip along the line of their joint, and in order that this tendency need not be resisted by the bolts 16, the inclined surfaces 12 and 14 are disposed at the angle shown.

The angle of inclination from the vertical of the surfaces 12 and 14 is made great enough to prevent wedging and binding of the projections 9 within the pockets 10. By providing these surfaces 12 and 14 at such an angle, there is also provided adequate clearance when the bushing 8 is inserted into or withdrawn from operative position. The relation of the inclined surfaces 12 and 14 to the driving faces 11 and 13 is such that the drive bushing 8 rests upon the surfaces 12 and against the driving faces 11, without contacting the bottom 17 of the pockets 10, as illustrated in Figures 2 and 4, with the result that there is no lost motion or driving clearance between the table 3 and the kelly drive bushing 8.

I have illustrated in Figure 4 diagrammatically the forces acting on each projection 9. In this illustration the weight W of the drive bushing 8, acting on the inclined surface 12, produces the reaction force R which is resisted by the driving surface 11. The driving force A which is normal to the driving surface 11 has a horizontal component B which is effective to rotate the bushing 8, and a vertical component C which serves to hold the bushing downwardly against displacement. The vector diagram as illustrated in Figure 4 is merely illustrative and is not intended to be an accurate vector analysis of the magnitude of the forces involved. It will be apparent from this illustration, however, that the inclination of the surface 12, in conjunction with the force of gravity, acts to apply a force R on the projection 9 in a direction counter to the driving force A.

If desired, means may be provided in the table 3 to supplement the action of the driving faces 11 and 13 to prevent upward displacement of the bushing 8. This means is herein illustrated as including locks 18 which may be of the type disclosed in the copending Young application hereinabove referred to. These locks are additionally useful when it is desired to rotate the rotary table in a reverse direction.

The bushing 8 is provided with a non-circular opening 19, the configuration of which corresponds with the configuration of the kelly 15. The kelly 15 is adapted to slidably and non-rotatably engage the bushing 8 within this opening. The ribs 20 of the bushing 8 are provided for rigidity. Grease fittings 21 may be utilized for lubricating the sliding contact within the opening 19. The lower end 22 of the kelly 15 is normally larger than its non-circular portion and therefore the kelly drive bushing rests upon this enlargement 22 and remains upon the kelly 15 when the kelly is withdrawn from the table 3. Upon such withdrawal of the kelly from the rotary table, the locks 18 are, of course, moved to their non-locking position.

In the modification of my invention as illustrated in Figures 5 and 6, four driving faces are provided instead of two. In this form of construction, each corner of the base 50 of the bushing 51 has a driving face 52 and an inclined surface 53 which engage their respective companion faces formed on the opening in the table 54. The driving faces 52 are formed with an engaging angle and the inclined surfaces 53 are formed with a similar but greater angle so that the weight of the bushing 51 acts to maintain the driving faces 52 in contact with their respective companion faces on the table 54. The included angle between the planes of opposed faces 52 and 53 is made great enough to avoid wedging of the bushing 51 within the table 54. It will be apparent that the forces acting on this modified form of construction are similar to those illustrated in Figure 4 for the bushing 8. The upper portion of bushing 51 may be constructed in a manner similar to that described for the bushing 8 and, as in the previous case, locks 55 may be provided if desired.

Having fully described my invention, it is to be understood that I do not wish to be limited to the details herein set forth, but my invention is of the full scope of the appended claims.

I claim:

1. In a kelly drive adapted to be driven by a rotary member, the combination of a bushing adapted to be received in driving engagement by said rotary member, said bushing and rotary member having driving faces, each of said driving faces having a substantially upright inclined surface arranged so that driving contact between said driving faces produces a downward force on said bushing, and means to resist said downward force including inclined companion surfaces on said bushing and rotary member, each of said companion surfaces being inclined in the same direction as said driving faces and being disposed on a greater angle from the vertical than the angle of said inclined driving faces.

2. In a kelly drive adapted to be driven by a rotary member, the combination of a bushing adapted to be received in driving engagement by said rotary member, said bushing and rotary member having driving faces, each of said driving faces having a substantially upright inclined surface sloping downwardly and in a direction generally opposed to the normal direction of rotation of said rotary member, whereby driving contact between said driving faces produces a downward force on said bushing, and means to resist said downward force including inclined companion surfaces on said bushing and rotary member, each of said companion surfaces being inclined in the same direction as said driving faces and being disposed on a greater angle from the vertical than the angle of said inclined driving faces, said driving faces and companion surfaces being arranged so that they converge outwardly.

3. A kelly drive as defined in claim 2, in which the driving faces are substantially radial.

4. In a kelly drive adapted to be driven by a rotary machine, the combination of a bushing and a rotary member, said bushing and rotary member having driving faces, each of said driving faces having a substantially upright inclined surface sloping downwardly and in a direction generally opposed to the normal direction of rotation of said rotary member, and means to resist said downward force including inclined companion surfaces on said bushing and rotary member, each of said companion surfaces being inclined in the same direction as said driving faces but on a greater angle from the vertical, the algebraic difference in inclination between said companion surfaces and said driving faces being great enough to permit easy withdrawal of said bushing from said rotary member.

5. In a kelly drive device adapted to be driven by the table of a rotary machine, the combination of a bushing carried centrally of said table, means whereby said bushing may rotate said kelly, a pair of laterally extending projections on said bushing, each of said projections having a substantially upright inclined driving face, said table having pockets for the reception of each of said projections, each of said pockets having a complemental driving face for engagement with the driving faces on said projections, said driving faces sloping downwardly and in a direction generally opposed to the normal direction of rotation of said table, and complemental inclined companion faces on said projections and pockets arranged on an angle from the vertical greater than the angle of said inclined driving faces and normally acting responsive to the weight of said bushing to maintain said inclined driving faces in driving contact.

6. In a kelly drive device adapted to be driven by a rotary member of a rotary machine, the combination of a polygonal-shaped bushing adapted to be received in driving engagement by said rotary member, said bushing having a pair of parallel sides, driving faces on said bushing and said rotary member at one of said parallel sides, each of said driving faces having a substantially vertical inclined surface arranged so that driving contact between said driving faces produces a downward force on said bushing, and means to resist said downward force including companion surfaces on said bushing and rotary member at the other of said parallel sides, each of said companion surfaces being inclined from the vertical in the same direction as said driving faces but on a greater angle, the algebraic difference in inclination between said companion surfaces and said driving faces being great enough to permit easy withdrawal of said bushing from said rotary member.

7. In a device for transmitting rotary motion from the table of a rotary machine to a drill stem extending therethrough, the combination of a substantially square drive bushing having means whereby it may rotate the drill stem, said drive bushing being adapted to be received in driving engagement with said rotary table, means forming a driving connection between said drive bushing and said rotary table, said means including substantially upright inclined driving faces on said bushing and said rotary table positioned at one end of each side of said bushing and adapted to meet in driving contact, said driving faces sloping downwardly and outwardly, and inclined companion surfaces on said bushing and said rotary table positioned at the other end of each side of said bushing, said inclined companion surfaces sloping downwardly and inwardly and being disposed on a greater angle from the vertical than the angle of said inclined driving faces, said bushing resting on the inclined companion surfaces of said table, whereby the weight of said bushing acts to urge said driving faces into engagement.

8. The combination with a rotary machine table and a kelly adapted to be driven by the rotary machine table, of a drive bushing having a non-rotatable and longitudinally slidable connection with the kelly and a releasable drive connection with the rotary machine table, said releasable drive connection including a plurality of wedge members carried by said drive bushing and pockets in said table receiving said wedge members, each wedge member and pocket being formed with complemental substantially upright inclined driving faces, the direction of inclination of said driving faces being downward and in a direction generally opposed to the normal direction of rotation of said table, each wedge member and pocket also being formed with complemental inclined companion surfaces of greater inclination to the vertical than said driving faces and having the same direction of inclination as said driving faces, said pockets extending below said wedge members to permit said wedge members to move farther into said pockets when wear occurs between said wedge members and said table.

LEWIS E. ZERBE.